US005938449A

United States Patent [19]

Masson et al.

[11] Patent Number: 5,938,449

[45] Date of Patent: Aug. 17, 1999

[54] REUSABLE WRITING BOARD WITH LOCKING FUNCTION

[75] Inventors: Daniel P. Masson, Burr Ridge; Jeffrey E. Bradley, Barrington; Tom Boursaw, Lake Forest, all of Ill.

[73] Assignee: Colonial Converting Corporation, Des Plaines, Ill.

[21] Appl. No.: 09/012,591

[22] Filed: Jan. 23, 1998

[51] Int. Cl.[6] .......... B43L 1/12; G09B 3/00

[52] U.S. Cl. .......... 434/415; 434/408; 434/365

[58] Field of Search .......... 434/408, 192, 434/410, 365, 415, 422

[56] References Cited

U.S. PATENT DOCUMENTS

| | | | |
|---|---|---|---|
| 177,589 | 5/1876 | Thomas | 434/415 |
| 369,663 | 9/1887 | Swaney | 434/415 |
| 1,757,287 | 5/1930 | Bildstein | 434/408 |
| 2,879,608 | 3/1959 | Watkins | 323/209 |
| 2,879,609 | 3/1959 | Watkins | 434/410 |
| 3,149,426 | 9/1964 | Kaeyer | 434/410 |
| 3,283,421 | 11/1966 | Schott | 434/415 |
| 3,405,460 | 10/1968 | Michaelson | 434/192 |
| 3,512,273 | 5/1970 | Baker, Jr. et al. | 434/163 |
| 3,579,871 | 5/1971 | Eddington | 434/410 |
| 5,324,202 | 6/1994 | Meyers et al. | 434/410 |
| 5,599,189 | 2/1997 | Kees | 434/370 |
| 5,626,478 | 5/1997 | Gatlin | 434/247 |

*Primary Examiner*—Robert A. Hafer
*Assistant Examiner*—Michael B. Priddy
*Attorney, Agent, or Firm*—Hill & Simpson

[57] ABSTRACT

A pressure sensitive reusable writing board is provided which includes a backing member that includes an upper section that folds down over the lower section that accommodates the wax layer and polyester writing sheet. As a result, the upper section provides a protective cover for the lower section. A distal edge of one of the upper or lower sections includes a loop which is in registry with a slot disposed in the distal edge of the other of the upper or lower sections. As a result, when the board is folded together to assume a closed position, the loop may be folded forward through the slot disposed in the opposing section or panel and the stylus may be inserted through the loop to lock the board into a closed position. As a result, any writing or artwork made on the reusable writing surface can be preserved while the board is being transported or handled.

19 Claims, 1 Drawing Sheet

REUSABLE WRITING BOARD WITH LOCKING FUNCTION

FIELD OF THE INVENTION

The present invention relates generally to reusable pressure sensitive writing boards commonly referred to as "slate boards" or "magic slates", of the type which are frequently used by children. More specifically, the present invention relates to a reusable writing board with a foldable backing member and a means for locking or holding the backing member in the folded or closed position.

BACKGROUND OF THE INVENTION

Currently available reusable writing boards typically include a stiff backing member, a portion of which is coated with wax which, in turn, is covered by a film which is caused to adhere to the wax by appropriate engagement with a writing implement or stylus as set forth, for example, in U.S. Pat. No. 4,051,609. As illustrated in said patent, the writing boards typically include a single, stiff backing member which functions like a clipboard.

However, one disadvantage to currently available reusable writing boards is that the magic slate portion or wax/film portion is not provided with any protective covering. Specifically, there is no structure provided to protect the writing surface from engagement by other articles which can result in the placement of extraneous marks on the writing surface. Thus, if a child writes a message or a drawing on the writing surface and desires to transport the reusable writing board to school or to another location, the writing surface can be bumped or engaged by other objects during the transport of the reusable writing board. As a result, extraneous marks or markings will be made on the writing surface which will diminish the quality of the child's message or artwork. Therefore, there is a need for an improved reusable writing board which includes a cover mechanism which would enable the writing board to be moved or transported after a message or artwork is written thereon which would protect the message or artwork from extraneous marks or markings.

In addition to the need for a protective cover for the writing surface, a need arises for a means for locking the protective cover in place during transport and handling. A cover that could become easily removed or open during transport and handling would, of course, be ineffective at protecting the writing surface from extraneous markings. Thus, in addition to a need for a protective cover, there is also a need for a way to lock a protective cover for a reusable writing surface in place during transport and handling.

SUMMARY OF THE INVENTION

The present invention satisfies the aforenoted needs by providing a reusable pressure-sensitive writing board that includes a protective cover and a locking function. The writing board assembly of the present invention includes a backing which consists of an upper panel hingedly connected to a lower panel at a middle section disposed between the upper and lower panels. The upper panel includes an upper distal edge that includes an upper recess. The upper recess includes a flexible loop. Similarly, the lower panel also includes a lower distal edge that includes a lower recess. When the upper panel is folded over the lower panel to assume a closed position, the loop of the upper panel is in alignment or in registry with the recess of the lower panel. The loop is also flexible so that when the backing is in a closed position, the loop can be folded through the lower recess.

The assembly also includes a stylus that is longer than both the loop and the lower recess. As a result, when the backing is in the closed position with the upper panel folded over the lower panel, the loop may be folded or pushed through the lower recess and the stylus inserted through the loop so that opposing ends of the stylus engage in the lower panel at opposing sides of the lower recess. In this position, the stylus engages one side of the lower panel while the upper panel is in abutting engagement with an opposing side of the lower panel. As a result, the upper panel is locked in this closed position because the stylus is sufficiently long enough so as to prevent it from being pulled through the lower recess while the stylus is inserted in the loop.

In an embodiment, the upper panel comprises a two-ply structure that includes an outer ply that is connected to the lower panel at the middle section and an inner ply that is integrally connected to the outer ply at the upper distal edge. The inner ply folds over the outer ply and is attached to the outer ply at an inside surface of the outer ply so as to provide a two-ply structure for the upper panel. In the closed position, the inner ply is sandwiched or disposed between the outer ply and the lower panel. In such an embodiment, the loop may be formed from a portion of the outer ply and a portion of the inner ply disposed at the upper recess. The portions of the inner and outer plies that form the loop are not connected within the boundaries defined by the upper recess so that said portions form a loop for accommodating the stylus.

In an embodiment, the upper and lower panels are fabricated from solid bleached sulfite ranging from 12 pt. to 24 pt. in weight.

In an embodiment, the upper and lower panels are fabricated from a single unitary piece of solid bleached sulfite.

In an embodiment, the loop may be fabricated from a strip of material having two opposing ends and a middle portion. The strip is folded over so that the two opposing ends are in abutting engagement and the two opposing ends are disposed between the inner and outer plies of the upper panel. The middle portion of the strip is disposed within the upper recess and the inner and outer plies and the opposing ends of the strip are connected so as to form the loop in the upper recess.

In an embodiment, the lower panel accommodates a wax layer that is engaged by a single-layer polyester film. The polyester film overlies the wax layer and includes a front side for engaging the stylus and a rear side for engaging the wax layer. The film also includes an upper margin which is glued to a wax-free upper margin or strip of the lower panel.

In an embodiment, the wax layer is deposited onto the lower panel in an amount ranging from 0.064 oz/ft$^2$ to about 0.075 oz/ft$^2$.

In an embodiment, the rear side of the polyester film is treated for printing and is thereafter printed with graphical material and a coating to provide the rear side with a partially opaque white appearance.

In an embodiment, the polyester film has a thickness ranging from about 1 mm to about 3 mm.

In an embodiment, the rear side of the polyester film on the upper margin thereof which is glued to the wax-free strip or margin of the lower panel is also colorized to effectively mask the glue or attachment means used to attach the upper margin of the film to the wax-free strip of the lower panel.

In an embodiment, the backing member is a unitary structure that is folded into three panels including a middle panel disposed between a lower panel and an upper panel.

The upper and middle panels are foldably connected at a common upper distal edge. The middle panel is folded over and overlies the upper panel to form a two-ply structure so that the middle panel is disposed between the upper and lower panels when the backing member is folded into a closed position. The common upper distal edge comprises two spaced-apart slots, each slot extends through portions of both the upper and lower panels so that the two slots form a loop from the portions of the upper and middle panels disposed between the two slots. The lower panel also includes a lower distal edge that is in registry with the common upper distal edge when the backing member is folded into the closed position. In addition, the lower distal edge of the lower panel includes a lower recess that is in registry with the loop when the backing member is folded into the closed position.

To lock the assembly, the loop is pushed through the lower recess and the stylus is inserted through the loop so that opposing ends of the stylus engage a surface of the lower panel opposite to the surface of the lower panel which is in abutting engagement with the upper panel.

It is therefore an advantage of the present invention to provide a protective cover mechanism for the writing surface of a reusable writing board.

Yet another advantage of the present invention is to provide a means for locking a protective cover over a reusable writing surface.

Still another advantage of the present invention is to provide an improved means for storing a stylus of a reusable writing board when the reusable writing board is not in use.

Other objects and advantages of the present invention will become apparent upon reading the following detailed description, upon reference to the accompanying drawings and to the appended claims.

BRIEF DESCRIPTION OF THE DRAWINGS

This invention is illustrated more or less diagrammatically in the accompanying drawings, wherein.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE PRESENTLY PREFERRED EMBODIMENTS

Figure 1:
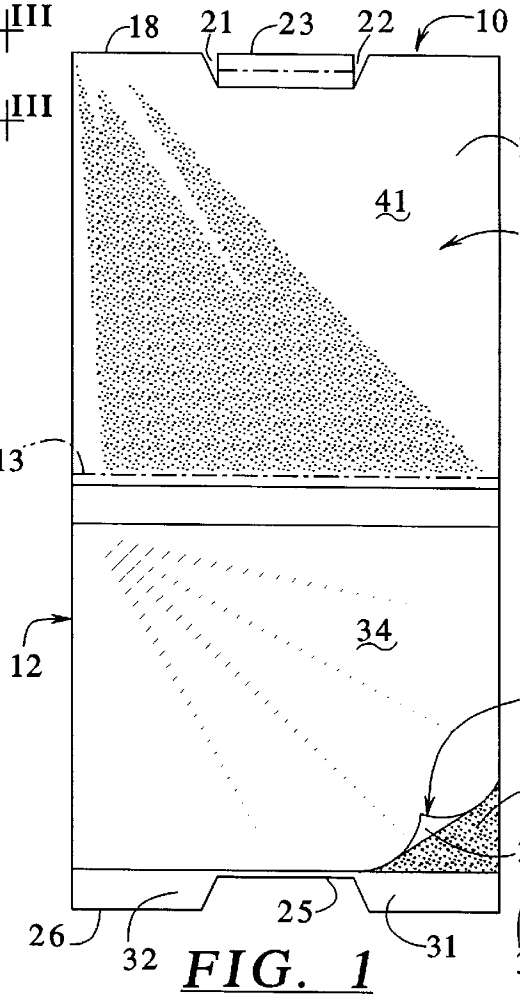
FIG. 1 is a plan view of the reusable writing board made in accordance with the present invention in an open or unlocked position.
Figure 2:
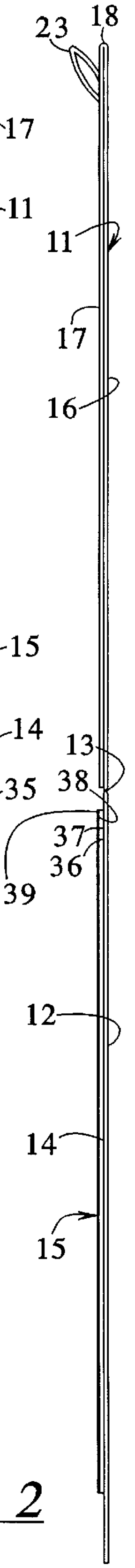
FIG. 2 is an end view of the reusable writing board as shown in FIG. 1 in the open or unlocked position.

Turning first to FIG. 1, a reusable pressure-sensitive writing board 10 is illustrated in an open position. Specifically, an upper section 11 is foldably connected to a lower section or panel 12 at a middle section or fold 13. The lower panel 12 includes a wax layer 14 disposed underneath a polyester sheet 15. The details of the construction of the lower panel with the wax layer 14 and polyester sheet 15 are discussed in detail in pending U.S. patent application Ser. No. 08/917,541, which is incorporated herein by reference. As shown in FIG. 2, the upper section 11 may be a two-ply structure which includes a middle panel 16 disposed between the lower panel 12 and an upper panel 17. The upper panel 17 is folded over at the common upper distal edge 18 and overlies the middle panel 16 to provide the two-ply structure illustrated in FIG. 2.

Figure 4:
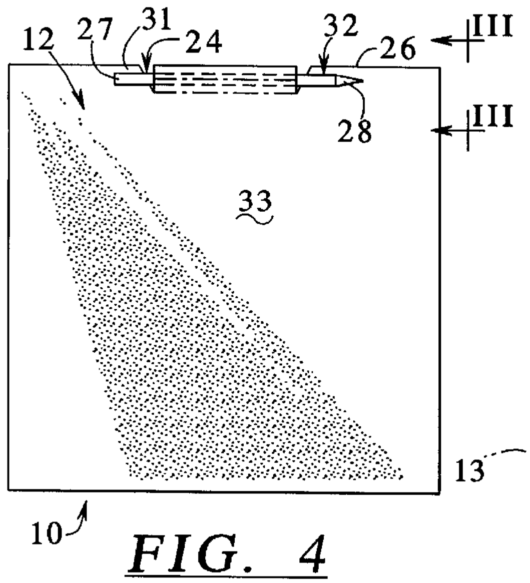
FIG. 4 is a plan view of a reusable writing board shown in FIG. 1 in the closed and locked position.
Figure 3:
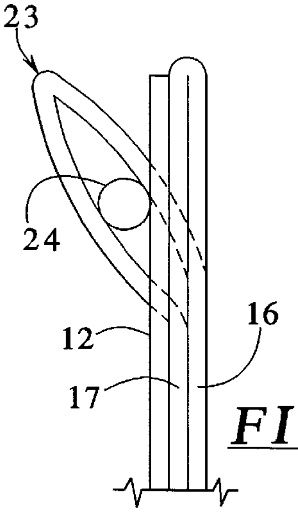
FIG. 3 is a partial end view taken along line 3—3 of FIG. 1.
Figure 5:
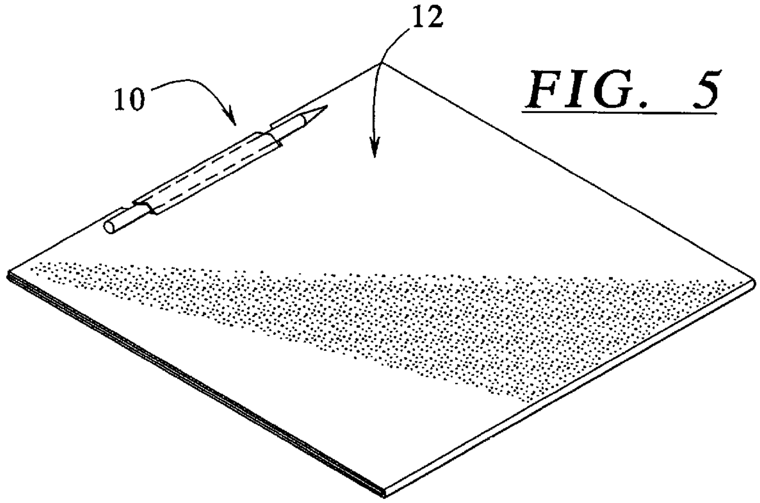
FIG. 5 is a perspective view of the reusable writing board shown in FIG. 1 in the closed and locked position.

As shown in FIGS. 1 and 3, two slots 21 and 22 are provided at the upper distal edge 18. The slots 21, 22 extend through both the upper panel layer 17 and lower panel layer 16. As best seen in FIGS. 1 and 3, the portion of the middle panel 16 and upper panel 17 disposed between the slots forms a loop 23. As shown in FIG. 3, when the board 10 has been folded into a closed position (see FIGS. 4 and 5) with the lower panel 12 in abutting engagement with the upper panel 17, the loop 23 may be folded forward through the slot 25 disposed in the lower edge 26 of the lower panel 12 (see FIG. 1) and the forward position of the loop 23 shown in FIG. 3 may be maintained by inserting the stylus 24 through the loop. As shown in FIGS. 4 and 5, the stylus 24 is longer than the loop 23 and the slot 25. As a result, the opposing ends 27, 28 of the stylus 24 engage the areas shown at 31, 32 respectively of the outside surface 33 of the lower panel 12 thereby locking the upper section 11 against the lower panel 12 in the position shown in FIGS. 4 and 5.

The upper panel 17 is preferably glued to the middle panel 16 with the exception of the areas that form the loop 23. Accordingly, the glue may be applied to an inside surface of either the middle panel 16 or the upper panel 17 (without applying glue or adhesive to the areas of the middle panel 16 or upper panel 17 that form the loop 23) and the slots 21 may be formed or cut after the upper panel 17 is glued into place against the middle panel 16.

In addition to the unitary construction of the loop 23 shown in the figures, the loop 23 may be formed from a separate member, such as a strip that is folded over and inserted between an outer ply 16 and inner ply 17 that are then glued together. The loop 23 may also be formed from a separate member such as a strip that is folded over and simply attached to a distal edge 18 of either a single-ply or multiple-ply upper panel or section 12. Still further, the loop 23 need not be disposed at the upper section or panel 11; it may also be disposed or attached to the lower panel 12.

The backing 21 is preferably a 12 pt. to 24 pt. solid bleached sulfite board. The wax coating 14 is preferably paraffin deposited in an amount so that 12 to 14 pounds of wax are applied per ream of backing material that forms the lower panel 12. In terms of ounces per square foot, the wax is preferably deposited in an amount ranging from 0.064 oz/ft$^2$ to 0.075 oz/ft$^2$. The wax should also be deposited in an smooth and uniform manner. Such methods of depositing wax will be apparent to those skilled in the art. The polyester sheet 15 is preferably a single polyester sheet having a smooth upper side 34 and a lower side 35 that has been treated so that it will accommodate printing as well as an overall white which will impart an opaque or partially-transparent coating which results in a whitish hue to the sheet 15. By providing a white appearance to the sheet 15, when the stylus 24 is used to press the sheet 15 into the wax layer 14, the resulting pattern simulates dark ink on a white paper thereby providing a realistic simulation for the child.

The polyester layer or film 15 is preferably printed on a standard flexographic press using a vulcanized cylinder for continuous coverage and standard flexo plates for additional graphics. The film 12 is reverse printed with solid lines. The viscosity of the overall white is adjusted to meet the opacity standards required for end use. The sheet 15 is attached to the lower panel 12 at an upper margin area or strip 36 that is free of wax. The sheet 15 is then attached by a glue or adhesive 37 which is applied to the wax-free strip 36 of the lower panel 12. In a preferred embodiment, the rear surface 38 of the upper margin 39 of the polyester sheet 15 that is attached to the wax-free strip 36 with the adhesive 37 is colorized to thereby hide the adhesive 37 from view. The coloring of the rear surface 38 of the margin 39 provides a neat colored border at the top of the sheet 15 for an improved aesthetic appearance.

The polyester sheet can range in thickness from 1 mm to 3 mm and is preferably about 2 mm thick.

The backing member which comprises the lower panel 12, middle panel 16 and upper panel 17 may be unitary in construction as shown in FIG. 2 or may be fabricated from two or more separate pieces of board. In addition to providing graphics on the underside 35 of the sheet 15, graphics may also be provided on the surface 41 of the upper panel 17.

Although only a limited number of embodiments of the present invention have been described and only one embodiment illustrated above, it will at once be apparent to those skilled in the art that variations may be made within the spirit and scope of the present invention. Accordingly, it is intended that the scope of the present invention be limited solely by the hereafter appended claims and not by any specific wording in the foregoing description.

What is claimed is:

1. A reusable pressure-sensitive writing board assembly with a locking function, the assembly comprising:

a backing comprising an upper panel hingedly connected to a lower panel at a middle section disposed between the upper and lower panels, the upper panel comprising an upper distal edge that comprises an upper recess, the upper recess accommodating a flexible loop, the lower panel comprising a lower distal edge that comprises a lower recess, the loop being in registry with the lower recess when the upper panel is folded over on top of the lower panel to assume a closed position, the assembly further comprising a stylus, the stylus being longer than the loop and the lower recess, the loop capable of being folded through the lower recess when upper and lower panels are in the closed position, the loop also capable of accommodating the stylus when the loop is folded through the lower recess so that opposing ends of the stylus engage the lower panel on opposing sides of the lower recess to thereby lock the loop in a folded position through the lower recess and to lock the upper and lower panels in a closed position, the upper panel further comprising a two-ply structure including an outer ply that is connected to the lower panel at the middle section and an inner ply that is integrally connected to the outer ply at the upper distal edge, the inner ply folding over the outer ply and being attached to the outer ply at an inside surface thereof so that the inner ply is sandwiched between the outer ply and the lower panel when the upper and lower panels are in a closed position, and wherein the loop is formed from a portion of the outer ply and a portion of the inner ply disposed at the upper recess, the portions of the inner and outer plies not being connected within the upper recess so that the portions of the inner and outer plies form the loop disposed within the upper recess.

2. The writing board assembly of claim 1 wherein the upper and lower panels are fabricated from solid bleached sulfite ranging from 12 pt. to 24 pt. in weight.

3. The writing board assembly of claim 2 wherein the inner and outer plies of the upper panel, the lower panel and the loop are formed from a single unitary piece of solid bleached sulfite.

4. The writing board assembly of claim 1 wherein the lower panel comprises a front side that is at least partially coated with a wax layer, the lower panel further comprising a wax-free upper margin, the wax layer being engaged by a single-layer polyester film, the polyester film overlying the wax layer, the polyester film comprising a front side for engaging the stylus and a rear side that engages the wax layer, the film comprising an upper margin, the rear side of the film at the upper margin being disposed in matching registry with and glued to the wax-free strip of the lower panel.

5. The writing board assembly of claim 4 wherein the wax layer is deposited onto the lower panel in an amount ranging from about 0.064 oz/ft$^2$ to about 0.075 oz/ft$^2$.

6. The writing board assembly of claim 4 wherein the rear side of the film is treated for printing and is printed with graphical material and a coating to provide the rear side with a partially opaque white appearance, the film having a thickness ranging from about 1 mm to about 3 mm.

7. The writing board assembly of claim 4 wherein the rear side of the film is printed with color at the upper margin which is effective to mask the glue from view.

8. A reusable pressure-sensitive writing board assembly with a locking function, the assembly comprising:

a backing comprising an upper panel hingedly connected to a lower panel at a middle section disposed between the upper and lower panels, the upper panel comprising an upper distal edge that comprises an upper recess, the upper recess accommodating a flexible loop, the lower panel comprising a lower distal edge that comprises a lower recess, the loop being in registry with the lower recess when the upper panel is folded over on top of the lower panel to assume a closed position, the assembly further comprising a stylus, the stylus being longer than the loop and the lower recess, the loop capable of being folded through the lower recess when upper and lower panels are in the closed position, the loop also capable of accommodating the stylus when the loop is folded through the lower recess so that opposing ends of the stylus engage the lower panel on opposing sides of the lower recess to thereby lock the loop in a folded position through the lower recess and to lock the upper and lower panels in a closed position, the upper panel further comprising a two-ply structure including an outer ply that is connected to the lower panel at the middle section and an inner ply connected to the outer ply at an inside surface thereof so that the inner ply is sandwiched between the outer ply and the lower panel when the upper and lower panels are in a closed position, and wherein the loop comprises a strip of material with two opposing ends and a middle portion disposed therebetween, the strip being folded over so that the opposing ends are in abutting engagement, the opposing ends of the strip being disposed between the inner and outer plies of the upper panel inside of the upper recess to form the loop disposed within the upper recess.

9. The writing board assembly of claim 8 wherein the lower panel and the outer and inner plies of the upper panel are fabricated from solid bleached sulfite ranging from 12 pt. to 24 pt. in weight.

10. The writing board assembly of claim 9 wherein lower panel and the outer and inner plies of the upper panel are fabricated from a single unitary piece of bleached sulfite.

11. A reusable pressure-sensitive writing board assembly with a locking function, the assembly comprising:

a backing member folded into three panels including a middle panel disposed between a lower panel and an upper panel, the upper and middle panels being foldably connected at a common upper distal edge, the upper panel being folded over into abutting engagement with the middle panel to form a two-ply structure so that the upper panel is disposed between the middle and lower panels when the backing member is folded into a closed position, the common upper distal edge comprising two spaced apart slots, each slot extending through portions of both the upper and lower panels so that the two slots form a loop from portions of the upper and middle panels disposed between the two slots, the lower panel comprising a lower distal edge that comprises a lower recess, the lower recess being in registry with the loop when the backing member is in the closed position, the assembly further comprising a stylus, the stylus being longer than the loop and the lower recess, the loop capable of being folded through the lower recess when the backing member is in the closed position, the loop also capable of accommodating the stylus when the loop is folded through the lower recess so that opposing ends of the stylus engage the lower panel on opposing sides of the lower recess to thereby lock the loop in a folded position through the lower recess and to lock the backing member in a closed position.

12. The writing board assembly of claim 11 wherein the backing member is fabricated from solid bleached sulfite ranging from 12 pt. to 24 pt. in weight.

13. The writing board assembly of claim 12 wherein the backing member is fabricated from a single unitary piece of solid bleached sulfite.

14. The writing board assembly of claim 11 wherein the lower panel comprises a front side that is at least partially coated with a wax layer, the lower panel further comprising a wax-free upper margin, the wax layer being engaged by a single-layer polyester film, the polyester film overlying the wax layer, the polyester film comprising a front side for engaging the stylus and a rear side that engages the wax layer, the film comprising an upper margin, the rear side of the film at the upper margin being disposed in matching registry with and glued to the wax-free strip of the backing.

15. The writing board assembly of claim 14 wherein the wax layer is deposited onto the lower panel in an amount ranging from about 0.064 $oz/ft^2$ to about 0.075 $oz/ft^2$.

16. The writing board assembly of claim 15 wherein the rear side of the film is treated for printing and is printed with graphical material and a coating to provide the rear side with a partially opaque white appearance, the film having a thickness ranging from about 1 mm to about 3 mm.

17. The writing board assembly of claim 16 wherein the rear side of the film is printed with color at the upper margin which is effective to mask the glue from view.

18. A reusable pressure-sensitive writing board assembly with a locking function, the assembly comprising:

a backing member folded into three panels including a middle panel disposed between a lower panel and an upper panel, the upper and middle panels being foldably connected at a common upper distal edge, the upper panel being folded over and overlying the middle panel to form a two-ply structure so that the upper panel is disposed between the middle and lower panels when the backing member is folded into a closed position, the common upper distal edge comprising two spaced apart slots, each slot extending through portions of both the upper and lower panels so that the two slots form a loop from portions of the upper and middle panels disposed between the two slots, the lower panel comprising a lower distal edge that comprises a lower recess, the lower recess being in registry with the loop when the backing member is in the closed position, the assembly further comprising a stylus, the stylus being longer than the loop and the lower recess, the loop capable of being folded through the lower recess when the backing member is in the closed position, the loop also capable of accommodating the stylus when the loop is folded through the lower recess so that opposing ends of the stylus engage the lower panel on opposing sides of the lower recess to thereby lock the loop in a folded position through the lower recess and to lock the backing member in a closed position, the lower panel comprising a front surface that is printed with at least one background color and that is at least partially coated with a wax layer, the front surface of the lower panel further having a wax-free strip, the wax layer is deposited onto the lower panel in an amount ranging from about 0.064 $oz/ft^2$ to about 0.075 $oz/ft^2$, the wax layer being removably covered with a single-layer polyester film, the polyester film having a front side for engaging a writing instrument and a rear side that engages the wax layer, the rear side of the film being treated for printing, printed with graphical material and coated with a partially transparent white coating to provide the film with a partially transparent white coating, the film also having a thickness ranging from about 1 mm to about 3 mm, the film further having an upper margin, the rear side of the film at the upper margin being glued to wax-free strip of the backing, the upper margin being colorized with a colored coating disposed on the rear side of the film at the upper margin.

19. The writing board assembly of claim 18 wherein the backing is further characterized as being solid bleached sulfite ranging from 12 pt. to 24 pt. in weight.

* * * * *